Nov. 11, 1969   R. G. SCHMOLLINGER   3,477,528
AUTOMATIC WEIGHING AND METERING CONTROL DEVICE
Filed Sept. 26, 1966                               4 Sheets-Sheet 1
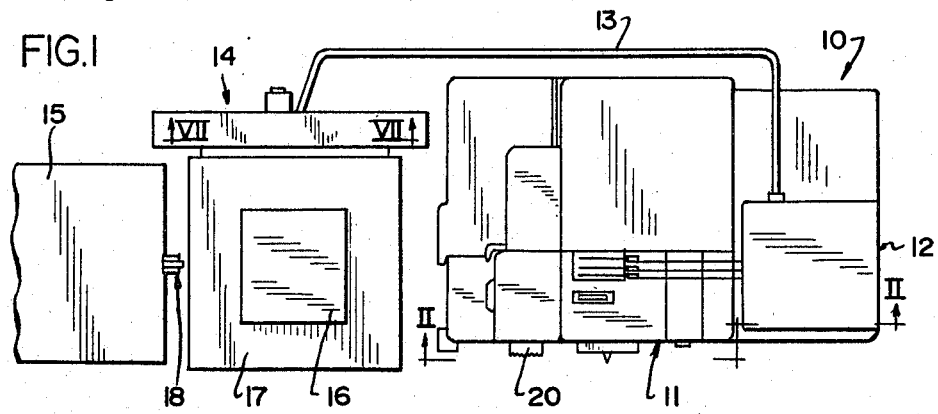
INVENTOR
RICHARD G. SCHMOLLINGER
BY Dawson, Tilton, Fallon,
Lungmus & Alexander
ATTORNEYS Nov. 11, 1969   R. G. SCHMOLLINGER   3,477,528
AUTOMATIC WEIGHING AND METERING CONTROL DEVICE
Filed Sept. 26, 1966   4 Sheets-Sheet 2
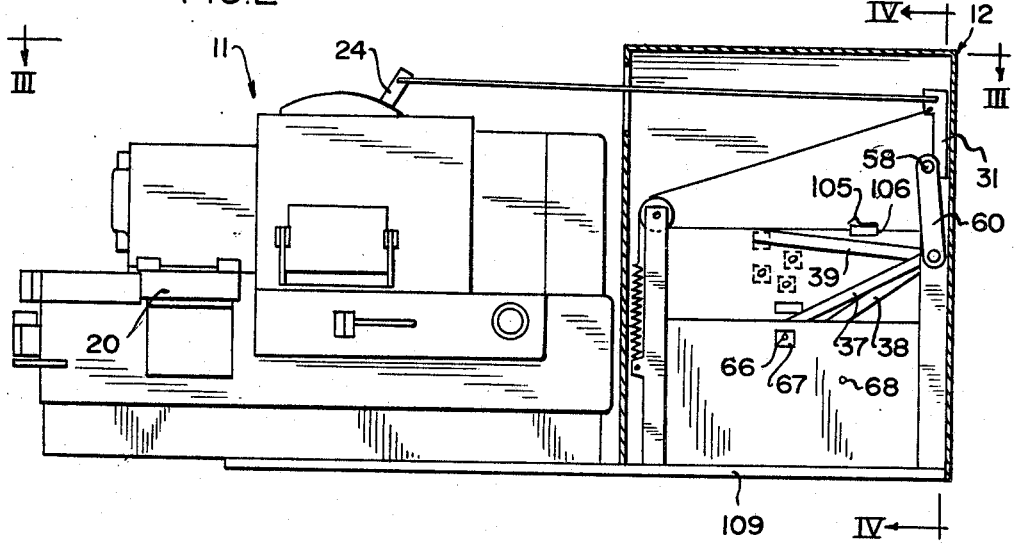
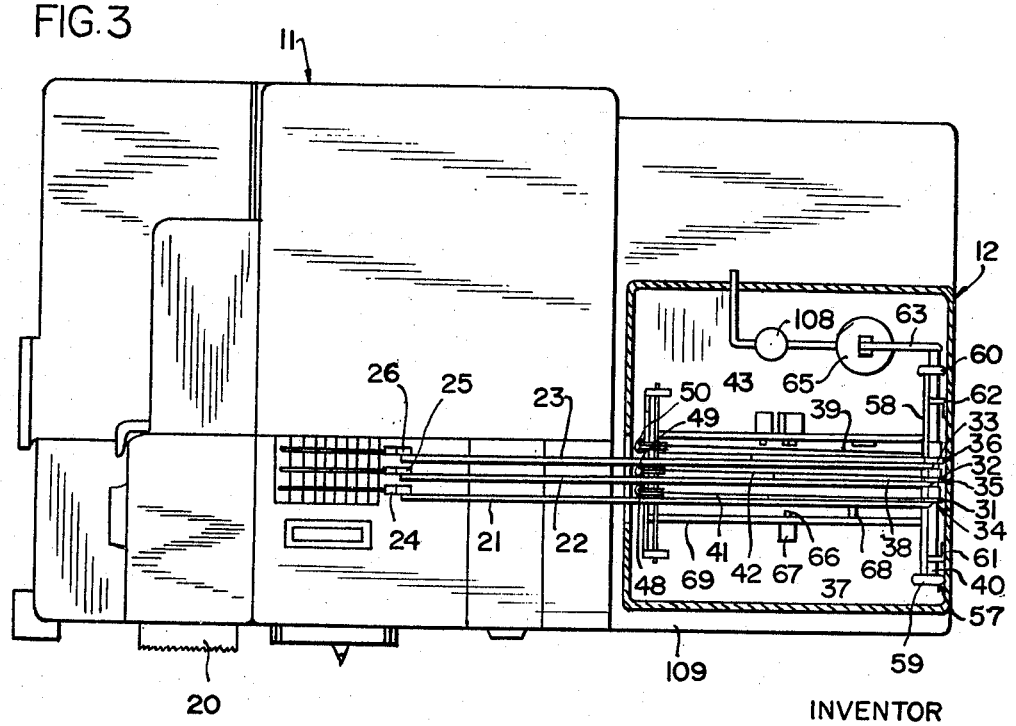
INVENTOR
RICHARD G. SCHMOLLINGER
BY Dawson, Tilton, Fallon,
Lungmus & Alexander.
ATTORNEYS Nov. 11, 1969  R. G. SCHMOLLINGER  3,477,528
AUTOMATIC WEIGHING AND METERING CONTROL DEVICE
Filed Sept. 26, 1966  4 Sheets-Sheet 3

INVENTOR
RICHARD G. SCHMOLLINGER
BY Dawson, Tilton, Fallon,
Lungmus & Alexander.
ATTORNEYS

United States Patent Office

3,477,528
Patented Nov. 11, 1969

3,477,528
AUTOMATIC WEIGHING AND METERING CONTROL DEVICE
Richard G. Schmollinger, Ridgefield, N.J., assignor to The Reuben H. Donnelley Corporation, New York, N.Y., a corporation of Delaware
Filed Sept. 26, 1966, Ser. No. 581,922
Int. Cl. G01g 23/38
U.S. Cl. 177—3          5 Claims

ABSTRACT OF THE DISCLOSURE

A weighing device actuating an electrical-mechanical linkage for automatically operating a postal meter in accordance with the weight of an object placed on the weighing device.

---

This invention relates to a device for use with a postal meter and more particularly to a device for automatically operating a postal meter, to eliminate manual steps heretofore required, and to obtain more rapid operation, with a high degree of accuracy and reliability. Important features of the device reside in a construction such that it can be readily connected to a standard type of postal meter, but it will be understood that other important features of the invention are applicable to a unitary device incorporating a postal meter and an automatic operating mechanism.

Postal meters of the type officially approved by the United States Post Office and used extensively throughout the country generally comprise stamping means for imprinting a postage value either directly on an envelope or on a strip of paper or stamp to be adhesively secured on an envelope or a package, with control members, usually in the form of levers, which are positionable according to the value of postage to be imprinted by the stamping means. Generally, the meters include a control member for controlling the "hundreds" digit of a value to be imprinted, as well as control members positionable according to the "units" and "tens" digits of the value to be imprinted. In the usual operation of a postal meter, the operator places an item such as a letter or a parcel on a scale, observes the postage value opposite the pointer of the scale, and then manually sets the control members according to the postage value which is observed. The operator then trips another control member which causes operation of the stamping means, and ejection of a strip or stamp having the postal value thereon, which he then moistens and secures to the item. With such an operation, mistakes often occur in the reading of the scale and in the setting of the postal meter. In addition, the operation is time-consuming.

This invention was evolved with the general object of overcoming the disadvantages of the conventional operation of postal meters, and of providing a device for automatically performing operations to obtain a high degree of accuracy and reliability, while saving time.

A more specific object of the invention is to provide a device which can be readily connected to a standard type of postal meter without modification thereof.

According to an important feature of the invention, a scale unit is provided for receiving an item to be mailed and a control unit is controlled from the scale unit for automatically positioning both units and tens control members of a postal meter in accordance with the weight of an item on the scale. Preferably, the control unit is additionally operative for positioning a hundreds control member in accordance with the weight of the item.

According to a specific feature of the invention, the device is usable with a postal meter wherein the control members are movable in parallel paths and the control unit includes first and second members movable in parallel paths aligned with the parallel paths of movement of the control members, with linkages being provided between the members of the control unit and the control members of the meter.

In accordance with another specific feature of the invention, actuating means are provided for moving the members of the control unit in one direction to move the control members of the meter toward maximum value positions, and stop means are controlled from the scale for stopping movement of the members of the control unit in accordance with the weight of the item. Preferably, the stop means in the form of solenoid means having plungers movable into the paths of movement of the members.

According to another feature, spring means are provided for effecting the movement in a direction to move the control members toward maximum value positions and a control member in the control unit is movable in one direction to allow such movement, while being movable in an opposite direction to return the control members to minimum value positions.

With these features, a mechanism is provided which can be readily connected to a standard type of postal meter and which is rugged in construction and reliable and accurate in operation.

According to another important feature of the invention, the scale unit includes an element such as a pointer moved by the weight of the item against a restraining force proportional to the distance of movement, and sensing means are provided for sensing the position of the element and for controlling the control unit in accordance with the position of the element. Preferably, the sensing means comprises contact means carried by the element and engageable with a plurality of contact segments along a member of insulating material disposed generally parallel to the path of movement of the element.

In accordance with a further specific feature of the invention, the member of insulating material is normally positioned with the contact segments out of engagement with the contact means, and means are provided for moving the member toward the path of movement of the contact means to engage one of the segments therewith. With this feature, the element can move freely with a minimum friction to reach a position which accurately reflects the weight of the item, after which the member of insulating material can be moved to engage the contact means with one of the segments.

Still another feature of the invention is in the provision of time delay means activated when an item is disposed on the scale and operable after a certain delay to initiate operation of the sensing means.

Still further features of the invention relate to a compact arrangement of parts of the control unit, to the electrical interconnection of contact segments with electrically energizable control devices of the control unit, and to arrangements for preventing operation of the postal meter in the event of the operational failures of the scale or control units.

This invention contemplates other and more specific objects, features and advantages which will become more fully apparent from the following detailed description taken in conjunction with the accompanying drawings which illustrate a preferred embodiment and in which:

FIGURE 1 is a top plan view illustrating scale and control units constructed in accordance with the principles of this invention, associated with a standard type of postal meter;

FIGURE 2 is a sectional view, taken substantially along line II—II of FIGURE 1, forming a front elevational view of mechanism of the control unit;

FIGURE 3 is a sectional view taken substantially along line III—III of FIGURE 2, constituting a top plan view of the mechanism of the control unit;

FIGURE 7 is a sectional view taken substantially along line VII—VII of FIGURE 1, showing the construction of the scale unit;

FIGURE 8 is a sectional view taken substantially along line VIII—VIII of FIGURE 7;

Figure 4:
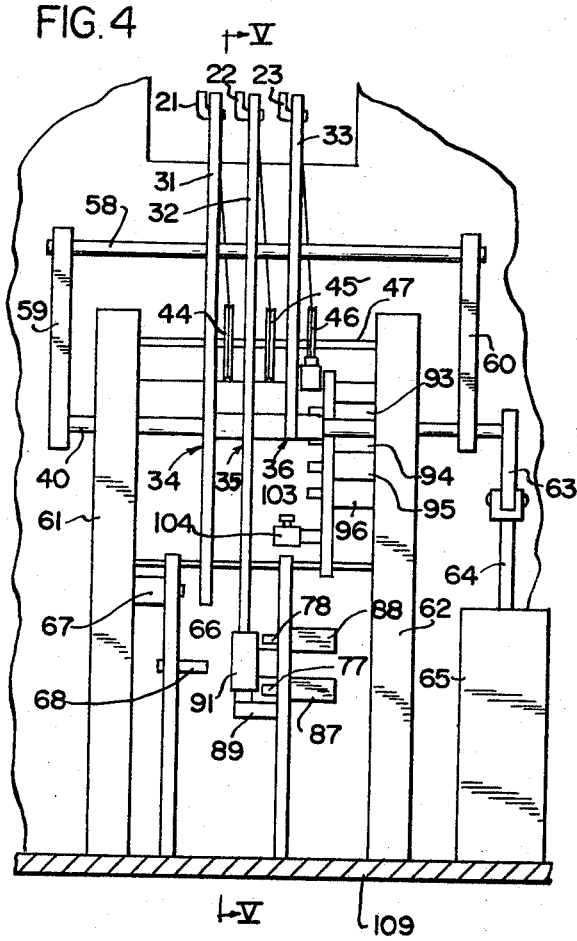
FIGURE 4 is a sectional view taken substantially along line IV—IV of FIGURE 2, constituting an end elevational view of the mechanism of the control unit.
Figure 5:
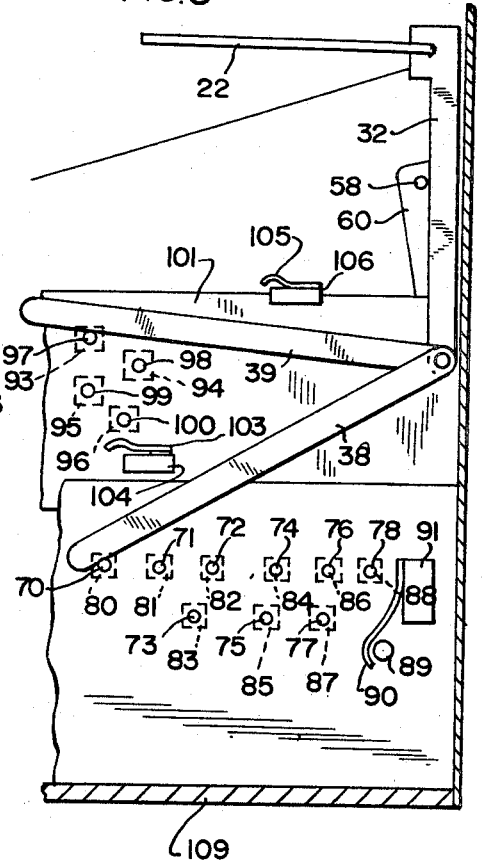
FIGURE 5 is a sectional view taken substantially along V—V of FIGURE 4.

Reference numeral 10 generally designates an automatic postal system constructed according to the principles of this invention, wherein a standard type of postal meter 11 is controlled by a control unit 12 which is connected through a cable 13 to a scale unit 14 to which packages to be mailed may be supplied from a conveyor belt 15.

In the general operation of the system, a package or other item 16 to be mailed is moved by the conveyor belt 15 onto a platform 17 of the scale unit 14 and in doing so passes over a sensing switch 18. After a certain time delay, sufficient for allowing a pointer of the scale 14 to come to rest, the weight registered by the scale pointer is electrically read and circuits in the control unit 12 are energized to cause the control unit 12 to mechanically set control levers of the postal meter 11 in accordance with the weight on the scale platform 17. The postal meter 11 is then tripped causing it to print the postal value on a stamp 20 which is ejected from the postal meter 11. The operator then takes the stamp 20 and applies it to the item 16.

The control unit 12 comprises a "units" control rod 21, a "tens" control rod 22 and a "hundreds" control rod 23 the ends of which are respectively pivotally connected to tab blocks 24, 25 and 26 which are mounted on the ends of control levers of the postal meter 11, such control levers being respectively operable to control the units, tens and hundreds digits of a postal value imprinted by the meter 11 on a stamp 20.

Figure 6:
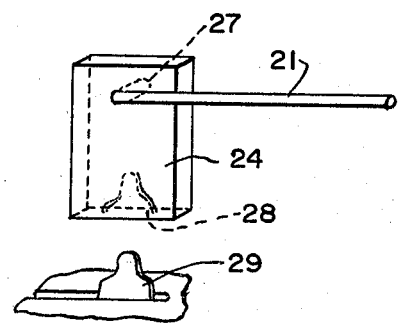
FIGURE 6 is a detailed view, showing the connection of links of the control unit to control tabs or levers of the postal meter.

As shown in FIGURE 6, the end of the control rod 21 is turned at right angles to provide a portion 27 which extends through an opening in the tab block 24, to provide the pivotal connection, and the tab block 24 is provided with a slot 28 which is shaped to fit tightly on the end of a units control lever 29 of the postal meter 11. The control rods 22 and 23 are similarly connected to the tab blocks 25 and 26 which are mounted in similar fashion on the tens and hundreds control levers.

In the illustrated system, which is designed for the mailing of books under current special fourth class rates, the units level is moved only between a "zero" position and a "five" position, because such special fourth class rates are in five cent increments, ten cents for the first pound, and five cents for each additional pound. The tens lever is movable to positions "zero" through "nine," while the hundreds lever is movable to positions "zero" through "three," the system being operable for postage values up to $3.55. It will be understood that a system could be constructed in accordance with the invention, wherein the units lever could be moved to positions "zero" through "nine" and the hundreds lever could be moved to higher digit positions, as necessitated by use of other rates or changes in postal rates.

The opposite ends of the control rods 21, 22 and 23 are bent at right angles to extend through and to be pivotally connected to the ends of upstanding arms 31, 32 and 33 of three bell crank levers 34, 35 and 36, respectively, having second arms 37, 38 and 39, the levers 34–36 being pivotally mounted on a common cross shaft 40.

The levers 34–36 are normally retained in positions as illustrated such that the control levers of the meter 11 are at minimum value positions. To operate the levers 34–36, a control rake assembly is actuated to allow the levers 34–36 to be moved under the influence of springs toward positions such that the control levers of the postal meter are at maximum value positions, with solenoid plungers being positionable in the path of the lever arms 37–39 to stop the levers at selected positions. After the postal meter is operated to imprint a postage value on a stamp, the control rake assembly is operated to return the levers 34–36 to the illustrated positions.

In particular, the upper ends of the arms 31–33 are connected to cables 41, 42 and 43 which extend over idler pulleys 44–46 on a cross shaft 47, to the ends of coiled tension spring 48–50, the opposite ends of which are fixedly secured to a crossbar 52, cross shaft 47 and crossbar 52 being supported by spaced uprights 53 and 54.

The control rake assembly is indicated by reference numeral 57 and comprises a rod 58 engageable with the arms 31–33, opposite ends of the rod 58 being supported at the ends of a pair of arms 59 and 60 secured to the cross shaft 40. Cross shaft 40 is supported by a pair of spaced uprights 61 and 62 and carried on an arm 63 which is connected to a piston rod 64 of an air cylinder device 65. When the piston rod 64 of the device 65 is moved downwardly, the rod 58 is moved in a counterclockwise direction as viewed in FIGURE 2, to allow the levers 34–36 to move in a counterclockwise direction under the influence of springs 48–50, until the levers engage stops as described below. When the piston rod 64 of the air cylinder device 65 is moved upwardly, the rod 58 is moved in a clockwise direction to operate as a return rake moving the levers 34–36 to the positions as illustrated.

The arm 37 of the units actuator lever 34 is engageable with a plunger 66 of a solenoid 67, the plunger 66 being extended into the path of the arm 37 when the solenoid is energized, to prevent movement of the actuated lever 34 from the illustrated position, and to hold the units control lever of the meter 11 in the zero value position thereof.

When the solenoid 67 is de-energized, the plunger 66 thereof is in a retracted position out of the path of the arm 37, and the arm 37 is moved under the influence of the spring 48 until engaged with a fixed stop 68. The units control lever of the meter 11 is then in a "five" position. The solenoid 67 and the stop 68 are supported on a plate 69, disposed on a vertical plane.

To stop the tens actuator lever 35 in a selected position, plungers 70–78 are extendable from a vertical plate 79 into the path of the arm 38 of the tens actuator lever 35, the plungers 70–78 being actuatable by solenoids 80–88 supported on the plate 79. When the solenoid 80 is energized to extend the plunger 70 into the path of the arm 38, the actuator lever 35 is held in its illustrated position, and the tens lever of the postal meter is held in its zero position. Solenoids 81–88 respectively actuate the plungers 71–78 to stop the actuator lever 35 and to position the tens control lever of the postal meter 11 in the "one" through "eight" positions thereof. If none of the solenoids 80–88 are energized, the tens actuator lever 35 is moved under the influence of the spring 49 until the arm 38 engages a fixed stop 89 and the tens lever of the meter is then moved to its "nine" position. When the arm 38 engages the fixed stop 89, it also engages an actuator 90 of a cancel switch 91. As described hereinafter, closing of the cancel switch 91 indicates a malfunction of the apparatus, except when the weight of the item is such that the tens lever should be moved to its "nine" position. Closure of the cancel switch 91 results in resetting of the system, and when the weight of the item is such that the tens control lever should be moved to its "nine," the cancel switch 91 is shorted out.

To control stopping of the hundreds actuator lever 36, four solenoids 93–96 are provided, energizable to project plungers 97–100 into the path of the arm 39. The solenoids 93–96 are mounted on a vertical plate 101. When none of the solenoids 93–96 are energized the arm 39 moves until it engages an actuator 103 of a cancel switch 104, to result in resetting of the system as hereinafter described.

Accordingly, when the control rake 57 is moved in a counterclockwise direction, the actuator levers 34–36 are either retained in the illustrated positions or allowed to move until stopped, in accordance with the energization of the solenoids, to thereby set the positions of the control levers of the meter 11. When the control rake 57 reaches the limit of its travel in a counterclockwise direction, the rod 58 engages an actuator 105 of a trip switch 106 which controls operation of the meter 11, after which the control rake 57 is operated in a return direction, as hereinafter described.

The air cylinder device 65 is controlled through a solenoid valve 108 which coupled to a compressed air source (not shown) is mounted on a base plate 109 which also supports the device 65, the uprights 53, 54, 61 and 62 and the other parts of the mechanism of the control unit. Preferably, the base plate 109 extends under the meter 11 so that the meter 11 and the control unit 12 are in proper operating relation.

Referring now to FIGURE 7, the scale 14 comprises a conventional mechanism for moving a pointer element 110 in response to the weight of the item 16 on the platform 17, against a restoring force proportional to the distance of movement. Pointer element 110 is supported at its lower end for pivotal movement about a horizontal axis.

In accordance with this invention, the pointer element 110 carries a pair of contacts 111 and 112 which are engageable with contact segments on a read out board 114 of insulating material having a lower edge connected by a hinge 115 to a support member 116 which is secured through angle brackets 117 and 118 to frame members 119 and 120 of the scale 14.

The read out board 114 is normally positioned rearwardly so that the contact segments thereon are out of the path of movement of the contacts 111 and 112, to allow free movement of the pointer element 110, and accurate positioning thereof in accordance with the weight of the item 16. After the pointer element 110 comes to rest, the read out board 114 is pivoted forwardly to engage the contact segments with the contacts 111 and 112. To control pivotal movement of the board 114, a bracket 121 on the rearward side thereof is pivotally coupled to the forward end of a plunger 122 of a solenoid 123 which is mounted on an angle bracket 124 secured to the support member 116.

In the illustrated arrangement, the pointer contact 111 is engageable with seventy contact segments which are arranged in an arc about the axis of pivotal movement of the pointer 110 and which are in four groups 127, 128, 129 and 130. The first group 127 contains nineteen contact segments, the first of which is a double zero segment 127a corresponding to a postage value of $0.00, the second of which corresponds to a postal value of $0.10, and the other seventeen of which correspond to postage value of $0.15 through $0.95, in $0.05 increments. The second group 128 contains twenty contact segments corresponding to postage values of $1.00 through $1.95; third group 129 contains twenty contact segments corresponding to postage values of $2.00 through $2.95; and the fourth group 130 contains twelve contact segments corresponding to postage values of $3.00 through $3.55. An additional contact segment 131 is provided, engageable by the pointer contact 111 when the pointer 110 is moved beyond the $3.55 position.

The pointer contact 112 is engageable with four contact segments 133–136 respectively corresponding to the groups 127–130. Segment 133 corresponds to postage values of $0.00 through $0.95; segment 134 corresponds to postage values of $1.00 through $1.95; segment 135 corresponds to postage values of $2.00 through $2.95; and segment 136 corresponds to postage values of $3.00 through $3.55.

Figure 9:
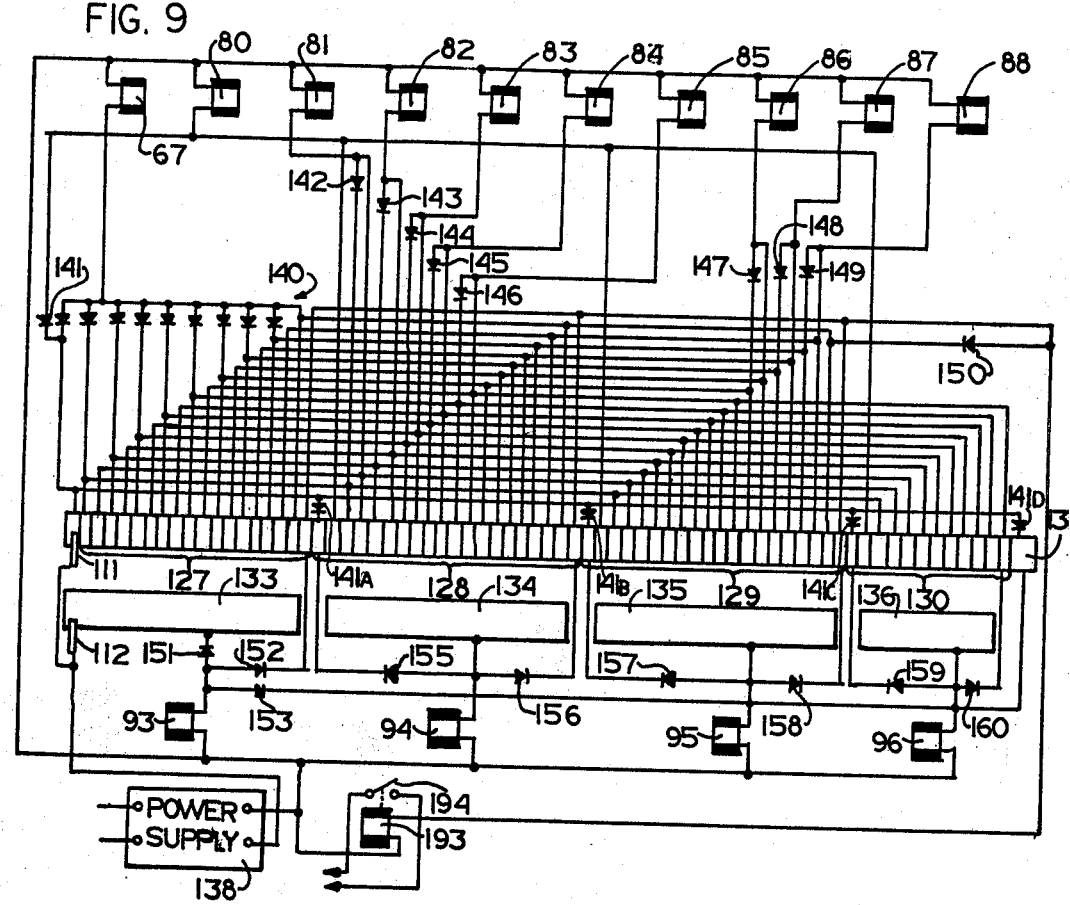
FIGURE 9 is a schematic electrical diagram showing the connection of contact segments of the meter unit to solenoids of the control unit.

Referring to the wiring diagram of FIGURE 9, the pointer contacts 111 and 112 are connected to the negative terminal of a power supply 138 having a positive terminal connected to terminals of all of the solenoids 67, 80–88, and 93–96. The other terminal of solenoid 67 is connected to a line 139 which is connected through ten diodes 140 to alternate contact segments of the groups 127–130 engaged by the contact 111, corresponding to postage values of $0.10, $0.20, $0.30 . . . $3.30, $3.40 and $3.50. Line 139 is also connected through one of the diodes 140 to the contact segment 131.

The solenoid 80 is connected directly to the double-zero contact segment and is connected through diode 141 and through diodes 141a, 141b, 141c and 141d to contact segments corresponding to postage values of $1.00, $2.00 and $3.00 and to contact segment 131 respectively and it is also connected directly to contact segments corresponding to postage values of $1.05, $2.05, and $3.05. The solenoid 81 is connected through diode 142 to contact segments corresponding to postage values of $0.10, $1.10, $2.10 and $3.10, with direct connections to the contact segments corresponding to postage values of $0.15, $1.15, $2.15 and $3.15. Similar connections are provided between solenoids 82–88 and the remaining contact segments of contact groups 127–130 through diodes 143–150. With this arrangement, the units control solenoid 67 and the tens control solenoids 80–88 are properly energized in accordance with the postage values corresponding to the weight of the item 16.

The hundreds control solenoid 93 is connected through a diode 151 to the contact segment 133, through a diode 152 to the last contact segment of the group 127, and through a diode 153 to the contact segment 131. The solenoid 94 is connected directly to the contact segment 134 and through diodes 155 and 156 to the first and last contact segments of the group 128. The solenoid 95 is connected directly to the contact segment 135 and through diodes 157 and 158 to the first and last contacts of the group 129. The solenoid 96 is connected directly to the contact segment 136 and through diodes 159 and 160 to the first and last contact segments of the group 130.

The diodes 140–150, 151–153 and 155–160 permit up to three solenoids connected to the same contact segment for application of power thereto, while obviating a common connection such as to prevent energization of a solenoid from a segment different from that to which it is connected.

As examples of the operation, when the item weighs up to 1 pound, requiring a postage of $0.10, the contact 111 engages the second segment of the group 127 to energize the solenoid 67 through one of the diodes 140 and to cause the units lever of the meter to be positioned in its "zero" position and to also energize the solenoid 81 through one of the diodes 142, to cause the tens lever of the meter to be positioned in its "one" position. At the same time, the contact 112 engages the contact segment 133 to effect energization of the solenoid 93 through the diode 151, and to cause the hundreds lever of the meter to be positioned in its "zero" position.

When a package weighs more than 1 pound and up to 2 pounds, requiring a postage value of $0.15, the contact 111 engages the third contact segment of the group 127 and the solenoid 67 is not energized so that the units lever of the meter is positioned in its "five" position, while the solenoid 81 is again energized through a direct connection thereto, to again cause the tens lever to be positioned in its "one" position. The solenoid 93 is again energized to cause the hundreds lever to be positioned in its "zero" position.

When the item weighs more than 2 pounds and up to 3 pounds, requiring a postage value of $0.20, the contact 112 engages the fourth segment of the first group 127, energizing the solenoid 67 through one of the diodes 140, and energizing the solenoid 82 through the diode 143, the tens lever being then positioned in its "two" position. The solenoid 93 is again energized through engagement of the contact 112 with the contact segment 133.

When the item weighs 19 pounds, requiring a postage value of $1.00, the first contact segment of the group 128 is engaged by the contact 112, to effect energization of the solenoid 67 through one of the diodes 140, and to effect energization of the solenoid 80 through diode 141, so that both the units and tens levers are positioned in "zero" positions. At the same time, a solenoid 94 is energized either through the diode 155, the first contact of the second group 128 and the contact 111, or through the contact segment 134 and the contact 112.

When the weight of the item is greater than 70 pounds, the contact 11 engages the segment 133 to effect energization of the solenoid 67 through one of the diodes 140, to effect energization of the solenoid 80 through a direct connection, and to effect energization of the solenoid 93 through the diode 153, so that the units, tens and hundreds levers are all positioned in their "zero" positions.

Figure 10:
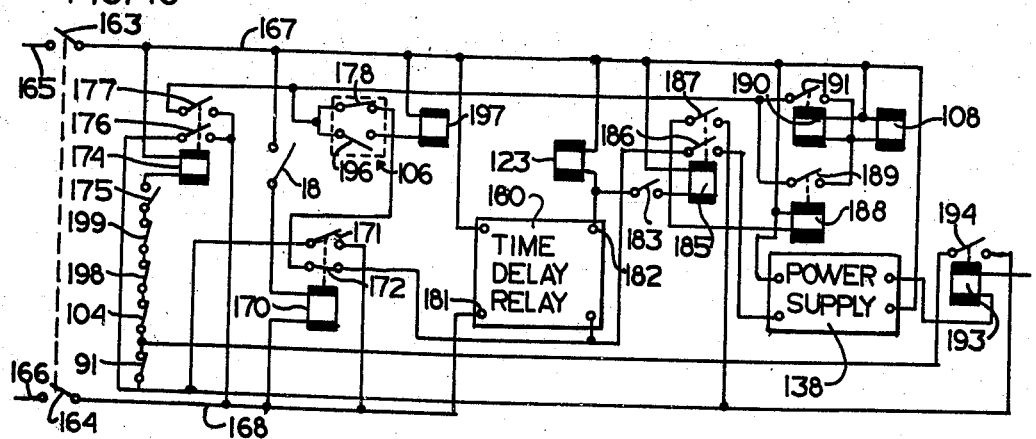
FIGURE 10 is a schematic electrical diagram, showing the interconnection of relays and other components of the control unit.

Referring to the wiring diagram of FIGURE 10, the system is placed in condition for operation by closing main switch contacts 163 and 164 to connect power supply lines 165 and 166 to lines 167 and 168. An item may then be supplied to the scale platform 17 from the conveyor 15, to pass over and close the sensing switch 18. A relay 170 is then energized to close a contact 171 thereof and to open a second contact 172 thereof. With contact 171 closed, a circuit is completed to energize a master control relay 174, assuming that a stand-by switch 175 has previously been moved to a closed position. When relay 174 is energized, a holding contact 176 is closed, to maintain relay 174 energized. A contact 177 is also closed to complete a circuit from line 168 through a contact 178 of the trip switch 106 to one terminal of the contact 172 of the relay 170. After the item passes over the sensing switch 18, the relay 170 is de-energized to close the contact 172 and to energize a time delay relay 180.

After a certain time delay, sufficient for allowing the pointer element 110 of the scale 14 to become stabilized, the time delay relay 180 complete a circuit from a terminal 181, connected to the line 168, to a terminal 182 connected through the read out board solenoid 123 to the line 167, whereupon the read out board is moved forwardly to engage the pointer contacts 111 and 112 with contact segments on the read out board 114. When the read out board 114 reaches the limit of its forward travel, it engages an actuator 183 of a limit switch 184 (see FIGURE 8), switch 184 being then closed to energize a relay 185 and to close contacts 186 and 187 thereof. Contact 186 functions to supply AC current to the primary winding of a transformer in the power supply 138 which then functions to supply DC current for operation of the solenoids 67, 80–88 and 93–96, shown in FIGURE 9, to effect positioning of stops in accordance with the weight of the item on the scale.

When contact 187 of relay 185 is closed, a relay 188 is energized to close a contact 189 thereof and to supply power to the solenoid valve 108 and to cause the air cylinder device 65 to be actuated to move the control rake in a counterclockwise direction, as viewed in FIGURE 2. The actuator levers 34–36 are then allowed to move under the influence of the springs 48–50 to position the levers of the meter 11 in accordance with the weight of the item on the scale 14. When control rake solenoid valve is energized, a relay 190 is also energized to close a holding contact 191.

If a malfunction should occur in the operation of either the tens or hundreds actuator levers 35 or 36, such that they are moved to their final mechanical stop positions, either the cancel switch 91 or the cancel switch 104 will be opened to de-energize the master control relay 174, whereupon all components will be reset to the original condition. It is noted, however, that if the weight of the item is such that the tens lever of the meter should be moved to its "nine" position, a circuit is completed through a contact segment of one of the groups 127–130, to energize a relay 193 and to close a contact 194 to short out the tens cancel switch 91.

Assuming that no malfunction occurs, the control rake 57 continues to the end of its travel and the rod 58 engages the actuator 105 of the trip switch 106 to open the contact 178 thereof. The time delay relay 180 is then de-energized, to result in de-energization of the read out board solenoid and to cause the board to be moved rearwardly to its initial position. Also, the power supply 138 is de-energized to de-energize the stop solenoids. It is noted, however, that the plungers of the previously energized stop solenoids remain in their outward stop positions because the frictional force exerted by pressure of the levers 37–39 thereagainst it is greater than the force exerted by the plunger retracting springs.

At this time, the solenoid valve 108 is held energized by the holding contact 191 of the relay 190.

When the actuator 105 of the trip switch 106 is engaged by the rod 58, a contact 196 thereof is closed to energize a clutch solenoid 197, which is installed on the meter 11. Energization of the solenoid 197 causes a drive clutch in the meter 11 to make one revolution, to eject a printed meter stamp 20. A limit switch 198 in the meter 11 is then momentarily opened to cut off the supply of current to the master control relay 174 and with the holding contact 176 thereof opened, it remains de-energized. The control rake solenoid valve 108 will then be de-energized to cause the control rake 57 to move in a clockwise direction and to return all of the actuator levers 34–36 to their initial positions.

All elements will then be in their initial position, ready for supply of the next item to the scale 14.

It should be noted that at any time, a manual reset switch 199 may be opened, if desired, to reset the system.

It will be understood that modifications and variations may be effected without departing from the spirit and scope of the novel concepts of this invention.

I claim as my invention:

1. In a device for use with a postal meter including stamping names for imprinting a postage value and units and tens control members positionable according to the units and tens digits of a value to be imprinted by said stamping means, a scale unit for receiving an item to be mailed, and a control unit controlled from said scale unit for positioning said units and tens control members in accordance with the weight of an item on said scale; said control unit including first and second members, means for connecting said first and second members to said units and tens control members, actuating means for moving said first and second members in one direction to move said units and tens control members toward maximum value positions, and stop means controlled from said scale for stopping movement of said first and second members in accordance with the weight of an item on said scale; said stop means comprising solenoid means having plungers movable into the paths of movement of said first and second members.

2. In a device for use with a postal meter including stamping means for imprinting a postage value and units and tens control members positionable according to the units and tens digits of a value to be imprinted by said stamping means, a scale unit for receiving an item to be mailed, and a control unit controlled from said scale unit for positioning said units and tens control members in accordance with the weight of an item on said scale; said scale unit including an element moved by the weight of the item against a restraining force proportional to the distance of movement, and sensing means for sensing the position of said element and for controlling said control unit in accordance with the position of said element.

3. In a device as defined in claim 2, time delay means activated when an item is disposed on said scale and operable after a certain delay to initiate operation of said sensing means.

4. In a device as defined in claim 2, said sensing means comprising contact means carried by said element, a member of insulating material generally parallel to the path of movement of said element, and a plurality of contact segments along said member engageable by said contact means.

5. In a device as defined in claim 4, said member being normally positioned with said contact segments out of engagement with said contact means, and means for moving said member toward the path of movement of said contacts means to engage one of said segments therewith.

References Cited

UNITED STATES PATENTS

| | | | |
|---|---|---|---|
| 2,036,538 | 4/1936 | Pearson | 177—3 X |
| 2,719,669 | 10/1955 | Schroeder | 235—1 |
| 2,730,303 | 1/1956 | Hajos | 235—136 |
| 3,039,686 | 6/1962 | Bell | 235—151 |
| 3,107,854 | 10/1963 | Lundquist | 235—101 |
| 3,145,792 | 8/1964 | Bell | 177—4 |

ROBERT S. WARD, JR., Primary Examiner

U.S. Cl. X.R.

177—5, 10, 12